United States Patent
Yoon et al.

(10) Patent No.: US 9,632,365 B2
(45) Date of Patent: Apr. 25, 2017

(54) DISPLAY DEVICE INCLUDING BLACK CONDUCTIVE SEALING MEMBER

(71) Applicant: Samsung Display Co., Ltd., Yongin-Si, Gyeonggi-Do (KR)

(72) Inventors: Won-Gap Yoon, Suwon-si (KR); Byung-Chul Kim, Asan-si (KR); Jae Hong Park, Seoul (KR); Sang Hee Yu, Hwaseong-si (KR); Young Joo Jeon, Seoul (KR); Kyung Seon Tak, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/000,112

(22) Filed: Jan. 19, 2016

(65) Prior Publication Data
US 2016/0357042 A1    Dec. 8, 2016

(30) Foreign Application Priority Data
Jun. 2, 2015  (KR) .................. 10-2015-0078101

(51) Int. Cl.
*G02F 1/1339* (2006.01)
*G02F 1/1335* (2006.01)
(Continued)

(52) U.S. Cl.
CPC .......... *G02F 1/1339* (2013.01); *G02F 1/1368* (2013.01); *G02F 1/13394* (2013.01);
(Continued)

(58) Field of Classification Search
CPC .............. G02F 1/1339; G02F 1/13392; G02F 1/133512
(Continued)

(56) References Cited

U.S. PATENT DOCUMENTS 6,120,858 A     9/2000  Hirano et al.
6,255,025 B1 *  7/2001  Akutsu .................. G02B 5/207
                                                           430/7
(Continued)

FOREIGN PATENT DOCUMENTS

KR    1020040049754 A    6/2004
KR    1020110054855 A    5/2011
(Continued)

*Primary Examiner* — Nimeshkumar Patel
*Assistant Examiner* — Christopher Raabe
(74) *Attorney, Agent, or Firm* — Cantor Colburn LLP

(57) ABSTRACT

A display device includes: a first panel including a common voltage wire on a first substrate, and a light blocking layer which is on the common voltage wire and exposes a portion of the common voltage wire, a second panel facing the first panel and including a common electrode on a second substrate; and a sealant between the first and second panels and electrically connecting the common electrode of the second panel and the common voltage wire of the first panel to each other. The sealant includes a first sealing portion having a first color and a second sealing portion having a second color different from the first color of the first sealing portion. The second sealing portion overlaps the exposed portion of the common voltage wire of the first panel and electrically connects the common electrode of the second panel to the common voltage wire.

19 Claims, 6 Drawing Sheets

(51) Int. Cl.
*G02F 1/1368* (2006.01)
*G02F 1/1343* (2006.01)

(52) U.S. Cl.
CPC .. *G02F 1/133512* (2013.01); *G02F 1/133514* (2013.01); *G02F 1/134309* (2013.01)

(58) Field of Classification Search
USPC ........................................................ 345/153
See application file for complete search history.

(56) References Cited

U.S. PATENT DOCUMENTS

| | | | | |
|---|---|---|---|---|
| 7,199,855 | B2* | 4/2007 | Yoshimi | G02F 1/1303 349/187 |
| 7,354,803 | B2* | 4/2008 | Koeda | H01L 27/3253 438/119 |
| 7,583,350 | B2* | 9/2009 | Chang | G02F 1/133345 345/104 |
| 2002/0196393 | A1* | 12/2002 | Tashiro | G02F 1/1303 349/106 |
| 2004/0135941 | A1* | 7/2004 | Nam | G02F 1/133512 349/110 |
| 2004/0174476 | A1* | 9/2004 | Yeh | G02F 1/133512 349/110 |
| 2006/0203168 | A1* | 9/2006 | Ishitani | G02F 1/1339 349/139 |
| 2009/0050884 | A1* | 2/2009 | Ye | H01L 29/7869 257/43 |
| 2014/0147659 | A1 | 5/2014 | Chun et al. | |

FOREIGN PATENT DOCUMENTS

KR   1020110093082 A   8/2011
KR   1020140035755 A   3/2014

* cited by examiner

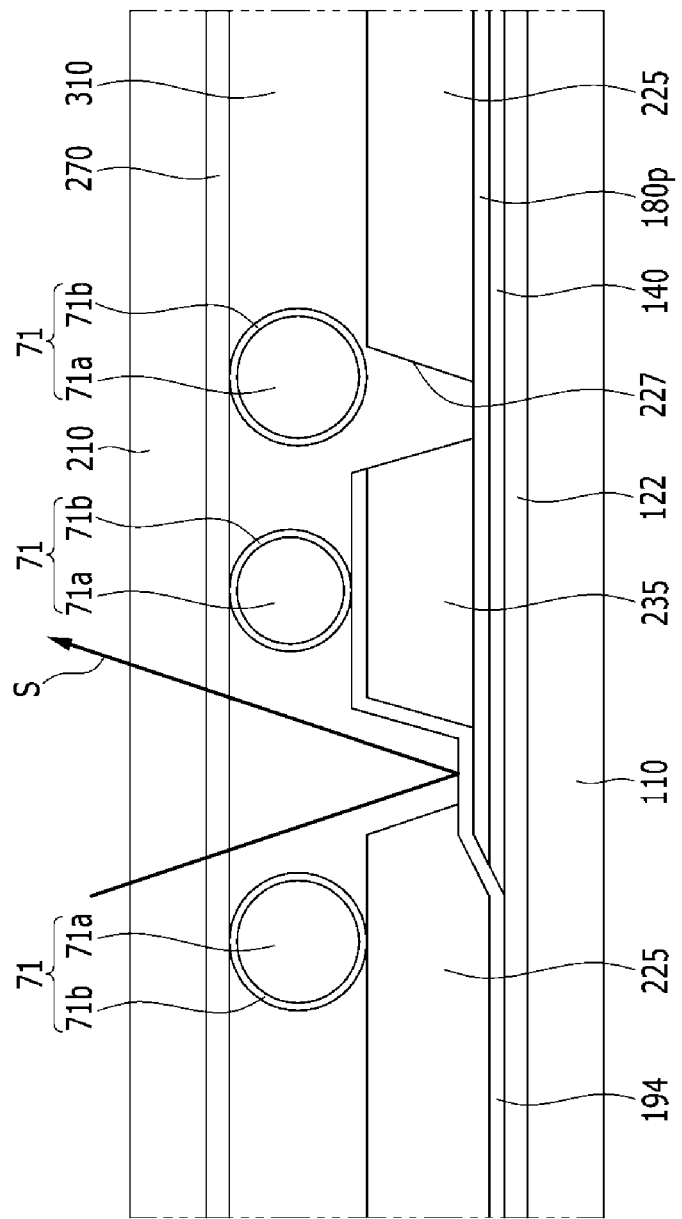

DISPLAY DEVICE INCLUDING BLACK CONDUCTIVE SEALING MEMBER

This application claims priority to Korean Patent Application No. 10-2015-0078101 filed on Jun. 2, 2015, and all the benefits accruing therefrom under 35 U.S.C. §119, the entire contents of which are incorporated herein by reference.

BACKGROUND

1. Field

The invention relates generally to a display device.

2. Description of the Related Art

Flat panel display devices have exploded onto the market, and sales thereof are growing quickly. A flat panel display is a display device with a small thickness relative to a planar size of the screen, and a liquid crystal display ("LCD") and an organic light emitting device ("OLED") are among widely used flat panel displays.

A liquid crystal display is one of flat panel displays that are widely used. The liquid crystal display includes a display panel including two display panel sheets in which field generating electrodes such as pixel electrodes and a common electrode are disposed, and a liquid crystal layer interposed between the display panel sheets. In the display panel of the liquid crystal display, a voltage is applied to the field generating electrodes to generate an electric field in the liquid crystal layer, which determines the direction of liquid crystal molecules of the liquid crystal layer, and an image is displayed by controlling the polarization of incident light.

Among liquid crystal displays, a liquid crystal display having a structure in which the field generating electrodes are respectively disposed in the two display panel sheets is widely used. Particularly, a general structure of the widely used liquid crystal display includes one display panel sheet having a plurality of pixel electrodes disposed in a matrix form and the other display panel sheet having a common electrode covering the whole surface thereof. In the liquid crystal display, each pixel electrode is separately applied with a data voltage and a common voltage is applied to the common electrode to display images.

In the display panel, a thin film transistor ("TFT") as a three-terminal element is connected to each pixel electrode for switching the voltage applied to the pixel electrode, and a plurality of gate lines transmitting signals to control the thin film transistor and a plurality of data lines transmitting the voltage that is applied to the pixel electrode are provided.

SUMMARY

One or more exemplary embodiment provides a display device which reduces or effectively prevents light leakage at a sealing portion thereof.

An exemplary embodiment of a display device includes: a first panel including a common voltage wire on a first substrate of the first panel; and a light blocking layer which is on the common voltage wire and exposes a portion of the common voltage wire; a second panel facing the first panel and including a common electrode on a second substrate of the second panel; and a sealant between the first panel and the second panel and electrically connecting the common electrode of the second panel and the common voltage wire of the first panel to each other. The sealant includes a first sealing portion having a first color, and a second sealing portion having a second color that is different from the first sealing portion. The second sealing portion overlaps the exposed portion of the common voltage wire of the first panel and electrically connects the common electrode of the second panel to the common voltage wire.

The second color of the second sealing portion may be a black color.

An optical density of the second sealing portion may be greater than or equal to about 2.0.

The second sealing portion may include a carbon black material.

The second sealing portion may be in a same layer as the first sealing portion.

The second sealing portion may include a conductive ball provided in plural and disposed therein, the conductive balls electrically connecting the common electrode and the second common voltage wire to each other.

Each conductive ball is defined by a body including an organic material and a conductive layer which is disposed on an outer surface of the body.

The light blocking layer may define therein a contact hole which exposes the portion of the common voltage wire.

The display device may further include a step compensation layer in the contact hole. The common voltage wire on the first substrate may extend to an upper surface of the step compensation layer in the contact hole defined by the light blocking layer.

The step compensation layer may include a blue color filter.

The light blocking layer may include a black-based material.

The display device may further include a display area in which an image is displayed and a peripheral area which surrounds the display area. The sealant may extend in the peripheral area along a circumference of the display area.

The common voltage wire may include: a first common voltage wire on the first substrate; and a second common voltage wire on the first common voltage wire and defining the exposed portion of the common voltage wire, the second common voltage wire contacting the second sealing portion.

The display device may include a display area in which an image is displayed and a peripheral area which surrounds the display area. The first panel may include disposed in the display area, a thin film transistor provided in plural on the first substrate; a color filter provided in plural on the thin film transistors; a pixel electrode on the color filters; and a light blocking member on the color filters. The light blocking member may include a column spacer which protrudes from an upper surface thereof and maintains a gap between the first panel and the second panel.

The light blocking member and the light blocking layer may include a same material.

The light blocking member and the column spacer may include a same material.

A protruded portion of the light blocking member may define the column spacer.

The light blocking member and the column spacer may each include a black-based material.

One or more exemplary embodiment of the invention provides the following effects.

In a display device, the second sealing portion and the first sealing portion respectively have different colors so that visibility of the step compensation layer provided at the second sealing portion due to external light can be reduced or effectively prevented.

BRIEF DESCRIPTION OF THE DRAWINGS

The above and other advantages and features of this disclosure will become more apparent by describing in further detail exemplary embodiments thereof with reference to the accompanying drawings, in which:

FIG. 6 illustrates an enlarged cross-sectional view of a comparative example of a peripheral area of a liquid crystal display.

DETAILED DESCRIPTION

Figure 1:
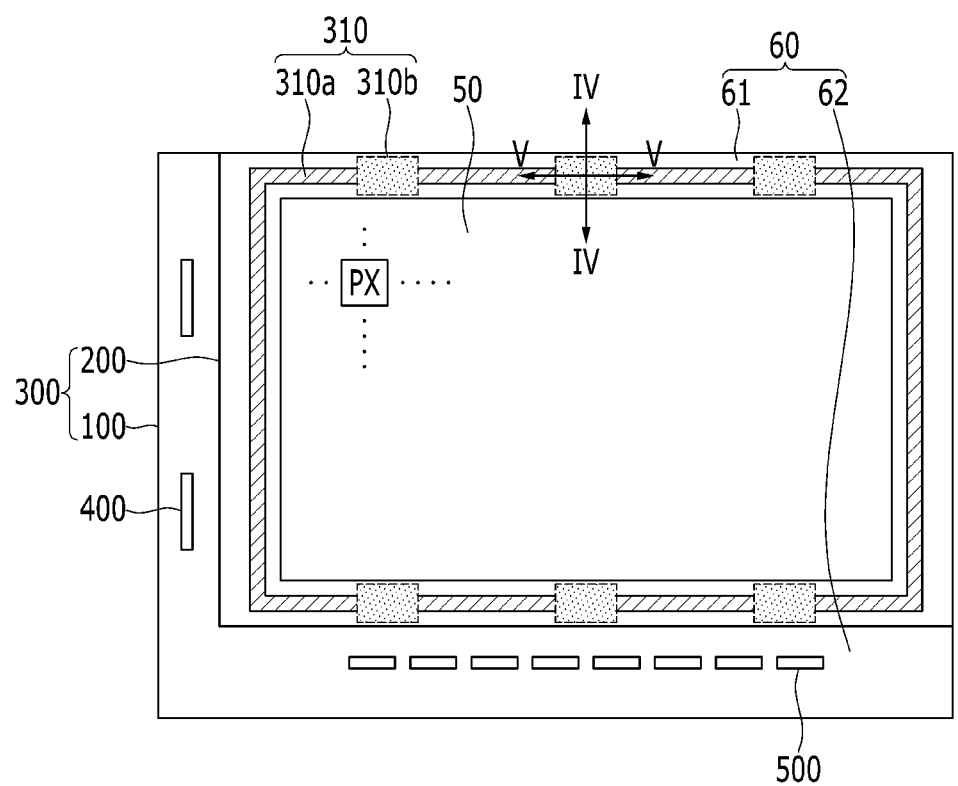
FIG. 1 illustrates a top plan view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Further, in order to apply the common voltage to the common electrode, a wire is further provided to transmit the common voltage to the display panel in which the thin film transistor and the pixel electrode are disposed, a conductive ball is disposed at a portion of the display panel to form a second encapsulation portion, and the common voltage wire and the common electrode are electrically connected through the second encapsulation portion. In order to form equipotential to the common electrode, a sufficient number of second encapsulation portions is used, but the number of second encapsulation portions is limited due to limits in space of the display device and a process of manufacturing thereof.

Hereinafter, a liquid crystal display according to the invention will be described in detail with reference to FIG. 1 to FIG. 6.

FIG. 1 illustrates a top plan view of an exemplary embodiment of a liquid crystal display according to the invention.

Referring to FIG. 1, an exemplary embodiment of a liquid crystal display according to the invention includes a lower panel 100 and an upper panel 200 disposed facing each other, and a liquid crystal layer (not shown) disposed between the lower panel 100 and the upper panel 200. The lower panel 100 and the upper panel 200 form a liquid crystal panel assembly 300.

In the top plan view, the lower panel 100 and the upper panel 200 each include a display area 50 and a peripheral area 60 which is provided at the peripheral area of the display area 50. The peripheral area 60 may be a portion of the liquid crystal panel assembly 300 excluding the display area 50.

The display area 50 includes therein a plurality of signal lines (not shown) and a plurality of pixels (not shown) which is connected to the signal lines and substantially arranged in a matrix format.

The signal lines include a gate line provided in plural (not shown) transmitting a gate signal (also referred to as a scanning signal) and a data line provided in plural (not shown) transmitting a data voltage. The plurality of gate lines and the plurality of data lines are provided in the lower panel 100.

Each pixel PX includes a switching element (not shown) such as a thin film transistor and the like, connected to a signal line, a pixel electrode (not shown) connected with each switching element and disposed in the lower display panel 100, a common electrode (not shown) disposed in the upper display panel 200, and a liquid crystal layer (not shown). The pixel electrode receives a data voltage through the switching element. The common electrode is disposed extended on the entire surface of the upper panel 200 and receives a common voltage.

When a gate signal is applied to the gate line, the data voltage is applied to the pixel electrode of the lower panel 100 through the data line, and the pixel electrode generates an electric field in the liquid crystal layer with the common electrode of the upper panel 200 having received the common voltage. Then, a degree of variation in polarization of incident light transmitted through the liquid crystal layer is changed according to a degree of inclination of liquid crystal molecules of the liquid crystal layer, and such a polarization variation is represented as a change in transmittance of the light by a polarizer (not shown), and as a result, the liquid crystal display displays an image.

The peripheral area 60 includes a first peripheral area 61 at which the lower panel 100 and the upper panel 200 both exist and overlap each other, and a second peripheral area 62 at which the upper panel 200 does not exist such that the lower panel 100 is exposed. The second peripheral area 62 is disposed at the periphery of the first peripheral area 61.

A sealant 310 is provided in the first peripheral area 61 to combine and fix the lower panel 100 and the upper panel 200 to each other and to enclose the liquid crystal layer. The sealant 310 is lengthwise extended along a circumference of the display area 50. The sealant 310 may define an outer boundary of the liquid crystal layer 3.

The sealant 310 includes a first sealing portion 310a and a second sealing portion 310b including a conductive member such as a conductive ball (not shown) having conductivity.

A gate driver 400 and a data driver 500 are each provided in the second peripheral area 62. The gate driver 400 is connected with the gate line lengthwise extended into the display area 50 and applies a gate signal, which is configured by combining a gate-on voltage that can turn on a switching element of each pixel PX and a gate-off signal that can turn off the switching element of the each pixel PX, to the gate line. The data driver 500 is connected with the data line lengthwise extended into the display area 50 and applies the data voltage to the data line. The gate driver 400 and the data driver 500 may be directly mounted to the lower display panel 100 at the second peripheral area 62 in an integrated circuit ("IC") chip form, may be mounted on a flexible printed circuit film (not shown) and thus attached to the lower panel 100 in a tape carrier package ("TCP") form, or may be integrated with a thin film transistor in the lower panel 100.

Hereinafter, an exemplary embodiment of a pixel in a display area according to the invention will be described with reference to FIG. 2 and FIG. 3.

Figure 2:
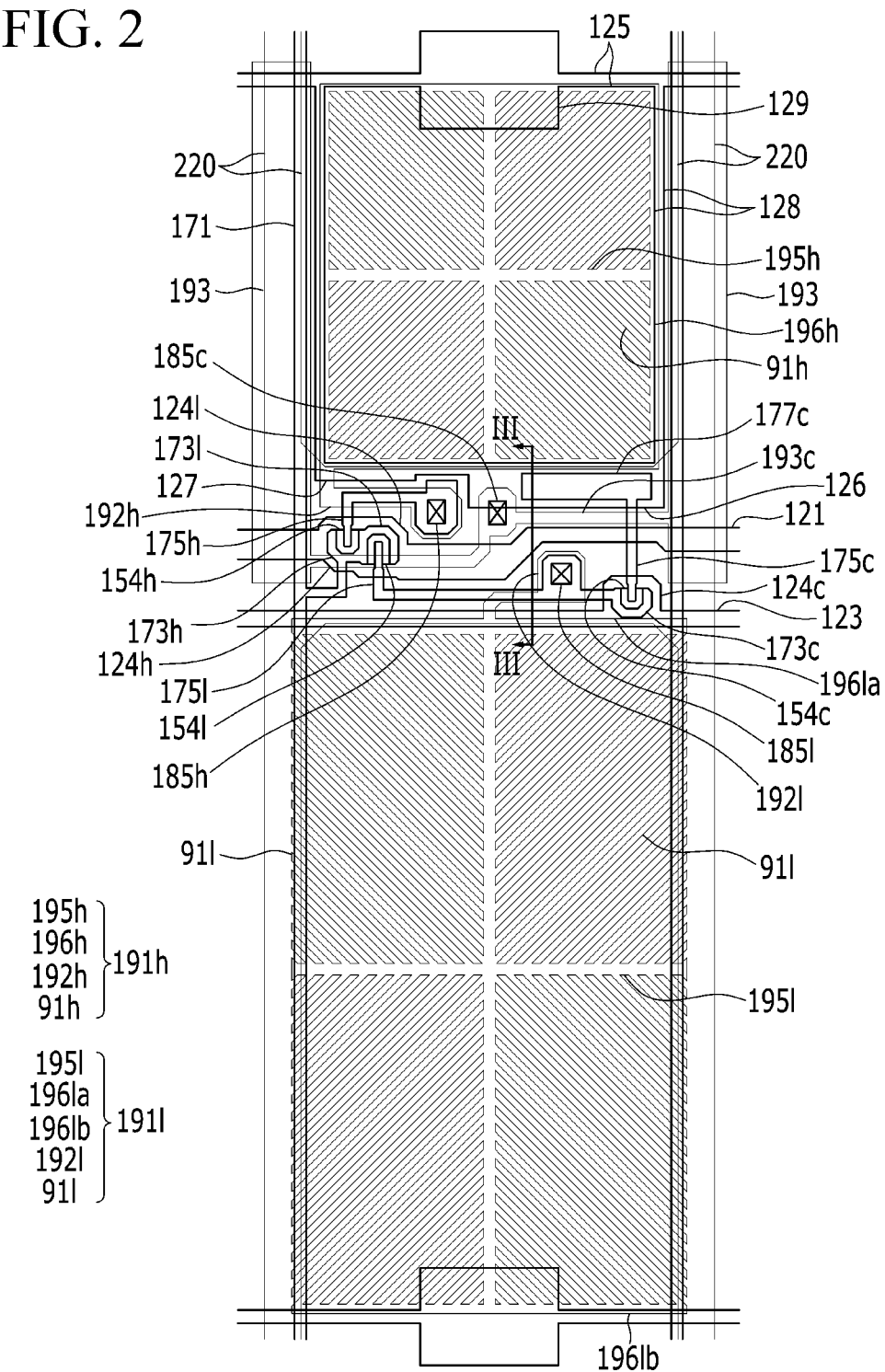
FIG. 2 illustrates a top plan view of an exemplary embodiment of one pixel of the liquid crystal display in FIG. 1.
Figure 3:
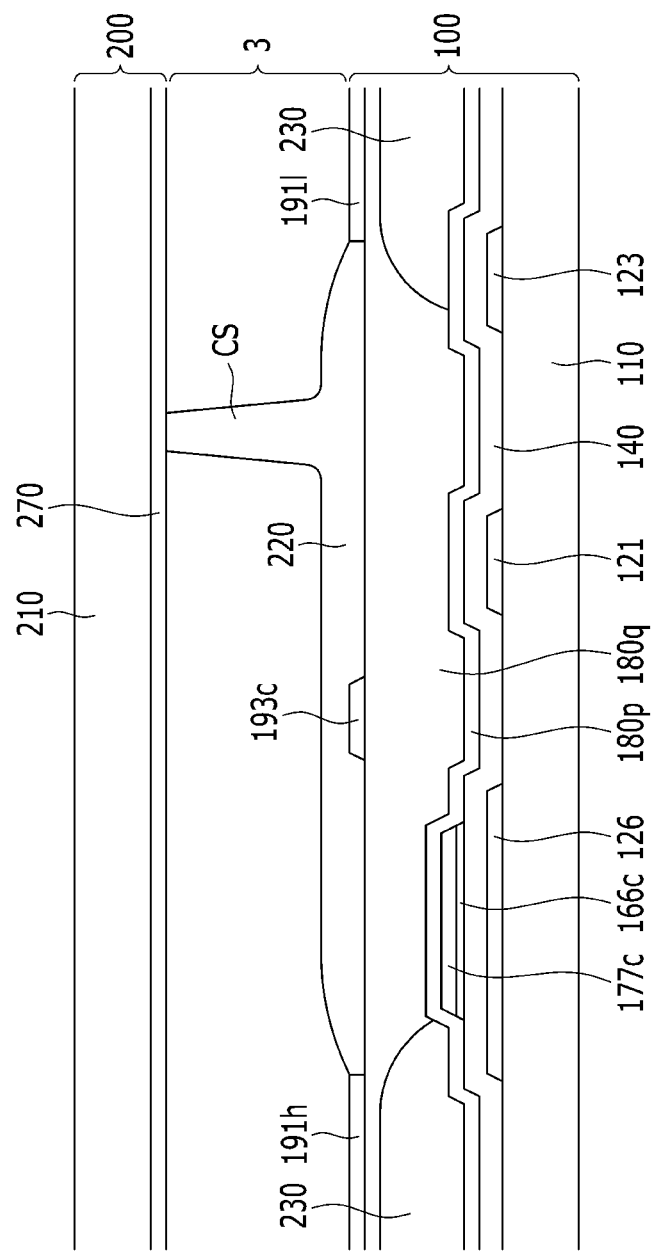
FIG. 3 illustrates a cross-sectional view taken along line III-III of FIG. 2.

FIG. 2 illustrates a top plan view of an exemplary embodiment of one pixel of a liquid crystal display according to the invention. FIG. 3 illustrates a cross-sectional view taken along line III-III of FIG. 2.

An exemplary embodiment of the liquid crystal display according to the invention includes the lower panel 100 and the upper panel 200 disposed facing each other, and a liquid crystal layer 3 provided between the two panels 100 and 200. A polarizer (not shown) may be provided on an outer surface of one or both of the display panels 100 and 200.

First, the lower panel 100 will be described.

A plurality of gate conductors including a gate line 121 provided in plural, a step-down gate line 123 provided in plural, and a storage electrode line 125 provided in plural are each disposed on a first substrate 110. The first substrate 110 may include a transparent material.

The gate line 121 and the step-down gate line 123 substantially lengthwise extend in a horizontal direction of the top plan view of FIG. 2 and transmit a gate signal. The gate line 121 includes a first gate electrode 124h and a second gate electrode 124l respectively protruding upward and downward from a main portion thereof, and the step-down gate line 123 includes a third gate electrode 124c protruding upward from a main portion thereof. The first gate electrode 124h and the second gate electrode 124l are connected with each other and thus form one protrusion portion in the top plan view. The gate line 121 may define the first gate electrode 124h and the second gate electrode 124l thereof respectively protruding upward and downward from the main portion thereof, and the step-down gate line 123 may defined the third gate electrode 124c thereof protruding upward from the main portion thereof.

The storage electrode line 125 also substantially lengthwise extends in the horizontal direction of FIG. 2, and transmits a predetermined voltage such as the common voltage. The storage electrode line 125 includes a storage electrode 129 protruding upward and downward from a main portion thereof, a pair of vertical portions 128 substantially lengthwise extending downward perpendicular to the gate line 121 from the main portion, and a horizontal portion 127 connecting distal ends of the pair of vertical portions 128 to each other. The horizontal portion 127 includes a storage expansion portion 126 expanded downward from a main portion thereof. The storage electrode line 125 may define the storage electrode 129, the vertical portions 128, the horizontal portion 127 and the storage expansion portion 126 thereof.

A gate insulating layer 140 covering the gate conductors 121, 123 and 125 is disposed on the gate conductors 121, 123 and 125.

A semiconductor stripe 154 (refer to FIG. 4) provided in plural is disposed on the gate insulating layer 140 and may include amorphous or crystalline silicon and the like. The semiconductor stripe 154 includes branches thereof substantially lengthwise extending in a vertical direction of the top plan view of FIG. 2 and disposed at locations respectively corresponding to the gate electrodes 124h, 124l and 124c. That is, the semiconductor stripe 154 include first and second semiconductors 154h and 154l that are extended toward the first and second gate electrodes 124h and 124l and disposed at locations respectively corresponding to the first and second gate electrodes 124h and 124l. Further, the semiconductor stripe 154 includes a third semiconductor 154c extended from the second semiconductor 154l and thus disposed at a location corresponding to the third gate electrode 124c. The semiconductor stripe 154 may define the first, second and third semiconductors 154h, 154l and 154c.

An ohmic contact 161 (refer to FIG. 4) and 166c (refer to FIG. 3) are provided in plural and disposed on the semiconductor stripe 154, and partially expose the semiconductor stripe 154 at locations corresponding to the gate electrodes 124h, 124l and 124c. That is, first ohmic contacts (not shown) are disposed on the first semiconductor 154h such that the semiconductor stripe 154 is exposed between the first ohmic contacts. Further, second ohmic contacts (not shown) and third ohmic contacts (not shown) are respectively disposed on the second semiconductor 154l and the third semiconductor 154c, and the semiconductor stripe 154 is respectively partially exposed.

A plurality of data conductors including a data line 171 provided in plural, a source electrode 173 (refer to FIG. 4) provided in plural, a drain electrode 175 (refer to FIG. 4) such as a first drain electrode 175h provided in plural, a second drain electrode 175l provided in plural, and a third drain electrode 175c provided in plural are disposed above the ohmic contacts 161 and 166c in a cross-sectional thickness direction.

The data line 171 transmits a data signal and substantially lengthwise extends in the vertical direction and thus crosses each the gate line 121, the step-down voltage line 123 and the storage electrode line 125. Each data line 171 includes a first source electrode 173h extending toward the first gate electrode 124h and the second gate electrode 124l from a main portion of the data line 171 and having the shape of a "U", and a second source electrode 173l having the shape of an inverted "U" (upside down "U"). Referring to FIG. 2, the first source electrode 173h and the second source electrode 173l are electrically connected with each other at a common side thereof. The data line 171 may define the first source electrode 173h and the second source electrode 173l thereof downward from the main portion thereof.

The first drain electrode 175h includes a relatively wide first end portion thereof and a bent-bar shaped linear portion defining a second end portion thereof opposite to the first end portion thereof. The distal end of the linear portion is surrounded by the first source electrode 173h, and the relatively wide first end portion has a relatively wide width and thus provides an area for contacting an upper layer of the lower panel among layers disposed on the first substrate 110. The second drain electrode 175l includes a bent-bar shaped linear portion defining a first end portion thereof, a U-shaped end portion defining a second end portion thereof, and a portion having an expanded width as compared to other portions of the second drain electrode 175l. The distal end of the linear portion is surrounded by the second source electrode 173l, and the U-shaped second end portion defines a third source electrode 173c. Further, the portion having the expanded width provides an area for contacting an upper layer of the lower panel among layers disposed on the first substrate 110. The third drain electrode 175c includes a straight bar-shaped linear portion defining a first end thereof and a relatively wide end portion 177c defining a second end thereof. The distal end of the linear portion is surrounded by the third source electrode 173c, and the relatively wide end portion 177c forms a step-down capacitor by overlapping the storage expansion portion 126.

The first to third gate electrodes 124h, 124l and 124c, the first to third source electrodes 173h, 173l and 173c, and the first to third drain electrodes 175h, 175l and 175c respectively form first, second and third thin film transistors, together with the first to third semiconductors 154h, 154l and 154c. A channel of each thin film transistor is defined by a respective semiconductor 154h, 154l and 154c between the source electrodes 173h, 173l and 173c and the respective drain electrodes 175h, 175l and 175c spaced apart from each other, respectively. Each channel may be formed at an area of the semiconductor 154h, 154l and 154c that is exposed by the ohmic contacts and by the respectively spaced apart source electrodes 173h, 173l and 173c and respective drain electrodes 175h, 175l and 175c rather than being covered by the ohmic contacts.

Further, the semiconductor stripe 154 including the semiconductors 154h, 154l and 154c substantially has the same plane shape as the data conductors 171, 175h, 175l and 175c and the ohmic contact 161 therebelow, except for the channel areas defined between the source electrodes 173h, 173l and 173c and the drain electrodes 175h, 175l and 175c respectively spaced apart from each other. That is, the semiconductor stripe 154 defining the semiconductors 154h, 154l and 154c includes portions thereof that are exposed rather than being covered by the data conductors 171, 175h, 175l 175c and are disposed between the source electrodes 173h, 173l and 173c and the drain electrodes 175h, 175l and 175c respectively spaced apart from each other.

A lower passivation layer 180p that may include or be made of an inorganic insulation material such as a silicon nitride or a silicon oxide is disposed above the data conductors 171, 175h, 175l and 175c and the exposed portion of the semiconductors 154h, 154l and 154c.

A color filter 230 provided in plural is disposed above the lower passivation layer 180p. The color filters 230 are disposed in most area, except for locations where the first thin film transistor, the second thin film transistor and the third thin film transistor are located. Each color filter 230 may display one of primary colors from among primary colors such as red, green and blue. In addition, each color filter 230 may be lengthwise extended along the vertical direction in a space between neighboring data lines 171. Color filters 230 displaying the same color may not neighbor each other in the top plan view.

An upper passivation layer 180q which includes or is formed of an organic material is disposed above the lower passivation layer 180p and above the color filters 230.

A first contact hole 185h exposing the relatively wide end portion of the first drain electrode 175h and a second contact hole 185l exposing the expanded width of the second drain electrode 175l are defined in the lower passivation layer 180p and the upper passivation layer 180q. In addition, a third contact hole 185c exposing an area of the storage expansion portion 126 that does not overlap the wide end portion 177c of the third drain electrode 175c, is defined.

A pixel electrode 191 including a first subpixel electrode 191*h* and a second subpixel electrode 191*l*, and a shielding electrode 193, are disposed above the upper passivation layer 180*q*.

Within a pixel, the first and second subpixel electrodes 191*h* and 191*l* are adjacent to each other in the vertical (e.g., column) direction. A vertical dimension (e.g., height) of the second subpixel electrode 191*l* may be about 1 to 3 times that of the first subpixel electrode 191*h*.

An overall shape of the first subpixel electrode 191*h* is a quadrangle, and includes a cross stem 195*h* defined by a horizontal stem and a vertical stem, an outer stem 196*h* defined at a periphery of the first subpixel electrode 191*h*, and a protrusion 192*h* protruding downward from a lower end of the outer stem 196*h* so as to be electrically connected with the first drain electrode 175*h* at the first contact hole 185*h*. Further, a first minute branch electrode 91*h* provided in plural is defined lengthwise extended in an oblique direction and one end of the respective first minute branch electrodes 91*h* is connected to the cross stem 195*h* and the outer stem 196*h*.

An overall shape of the second subpixel electrode 191*l* is a quadrangle, and includes a cross stem 195*l* defined by a horizontal stem and a vertical stem, an upper horizontal portion 196*l*a, a lower horizontal portion 196*l*b, and a protrusion 192*l* protruding upward from the upper horizontal portion 196*l*a so as to be electrically connected with the second drain electrode 175*l* at the second contact hole 185*l*. Further, a second minute branch electrode 91*l* provided in plural is defined lengthwise extended in an oblique direction. A first end of the minute branch electrode 91*l* is connected to the cross stem 195*l* while a distal second end thereof defines an outer edge of the second subpixel electrode 191*l*.

The first subpixel electrode 191*h* and the second subpixel electrode 191*l* are respectively divided into four sub-regions by the respective cross stems 195*h* and 195*l*. Each sub-region includes a plurality of minute branch electrodes 91*h* and 91*l* obliquely extended from the cross stems 195*h* and 195*l* to an outer edge of the first subpixel electrode 191*h* and the second subpixel electrode 191*l*, respectively. The minute branch electrodes 91*h* and 91*l* of the respective sub-regions form minute slit patterns. An angle formed by the minute branch electrodes 91*h* and 91*l*, and the gate lines 121, may be substantially about 45 degrees or about 135 degrees. Lengths of the minute branch electrodes 91*h* and 91*l* of neighboring sub-regions may be disposed perpendicular to each other to cross each other.

The protrusion 192*h* of the first subpixel electrode 191*h* receives a data voltage from the first drain electrode 175*h* through the first contact hole 185*h*, and the protrusion 192*l* of the second subpixel electrode 191*l* receives a data voltage from the second drain electrode 175*l* through the second contact hole 185*l*. The data voltage applied to the second subpixel electrode 191*l* may be lower than the data voltage applied to the first subpixel electrode 191*h*.

The shielding electrode 193 is electrically connected with the storage expansion portion 126 at the third contact hole 185*c*, and receives a predetermined voltage such as a common voltage applied to the storage expansion portion 126. The shielding electrode 193 electrically blocks the data lines 171 while partially covering the data lines 171 so as to reduce or effectively prevent signal delay due to coupling. The shielding electrode 193 may serve to increase storage capacitance of a pixel PX by being connected with the storage expansion portion 126.

A light blocking member 220 is disposed at an area where the color filters 230 are not disposed and an area that partially overlaps the color filters 230. The light blocking member 220 is disposed above the upper insulating layer 180*q*, and reduces or effectively prevents light leakage at the shielding electrode 193. The light blocking member 220 includes a portion lengthwise extended to cover areas where the first thin film transistor, the second thin film transistor and the third thin film transistor are located and a portion lengthwise extended along a length of the data line 171.

A column spacer CS protruding from the upper surface of the light blocking member 220 is disposed to be extended into the liquid crystal layer 3. A height of the column spacer CS from the light blocking member 220 is substantially the same as a thickness of the liquid crystal layer 3, and maintains a cell gap between the lower panel 100 and the upper panel 200. The column spacer CS includes or is made of the same material as the light blocking member 220, and is integral with the light blocking member 220. A portion of the light blocking member 220 may define the column spacer CS.

The light blocking member 220 and the column spacer CS include or are made of a light blocking material such as a black-based material. The black-based material may be a material including at least one of carbon black, an organic pigment, an inorganic pigment, and a red, green blue ("RGB") mixture pigment.

An alignment layer (not shown) may be disposed above the first and second subpixel electrodes 191*h* and 191*l* and above the light blocking member 220.

The first and second subpixel electrodes 191*h* and 191*l* applied with the data voltage generate an electric field with a common electrode 270 of the upper display panel 200 such that a direction of liquid crystal molecules of the liquid crystal layer 3 between the two electrodes 191 and 270 is determined. A degree of variation in polarization of incident light on the liquid crystal layer 3 is changed according to a degree of inclination of liquid crystal molecules of the liquid crystal layer, and such a polarization variation is represented as a change in transmittance of the light by a polarizer (not shown), and as a result, the liquid crystal display displays an image.

In the exemplary embodiment, since the first and second subpixel electrodes 191*h* and 191*l* include four different sub-regions of which the minute branch electrodes 91*h* and 91*l* have different length extension directions, the liquid crystal molecules of the liquid crystal layer 3 are inclined in four directions. As described, a reference viewing angle of the liquid crystal display is increased by varying the inclination direction of the liquid crystal molecules of the liquid crystal layer 3.

The first subpixel electrode 191*h* and the common electrode 270 form a first liquid crystal capacitor with the liquid crystal layer 3 between the two electrodes 191*h* and 270, and the second subpixel electrode 191*l* and the common electrode 270 form a second liquid crystal capacitor with the liquid crystal layer 3 between the two electrodes 191*l* and 270, to maintain the supplied voltage even after the first and second thin film transistors and are turned off.

The first and second subpixel electrodes 191*h* and 191*l* form first and second storage capacitors by overlapping the storage electrode 129 and the storage electrode lines 125, and the first storage capacitor and the second storage capacitor respectively reinforce voltage storage capability of the first and second liquid crystal capacitors.

In the exemplary embodiment, the voltage of the first subpixel electrode 191*h* and the voltage of the second subpixel electrode 191*l* may be changed, and when the first subpixel electrode 191*h* and the second subpixel electrode 191*l* have different voltages, voltages applied to the first and second liquid crystal capacitors are also changed, thereby causing a change in luminance. According, side visibility can be improved by properly adjusting voltages of the first and second liquid crystal capacitors.

Next, the upper panel 200 will be described.

In the upper panel 200, the common electrode 270 is disposed on the entire surface of a second substrate 210. The second substrate 120 may include a transparent material. The common electrode 270 may include or be made of a transparent conductor material such as indium tin oxide ("ITO"), indium zinc oxide ("IZO"), and the like. An alignment layer (not shown) may be disposed on the common electrode 270, and the alignment layer may be a vertical alignment layer.

A polarizer (not shown) may be provided on an outer surface of the lower panel 100 and the upper panel 200.

As described, the upper panel 200 has a simple structure in which the common electrode 270 is disposed above the second substrate 210, and thus a manufacturing process of the liquid crystal display can be simplified and misalignment with the lower panel 100 can be reduced. The upper panel 200 may include only the common electrode on the second substrate 210, but is not limited thereto. Where the upper panel 200 includes an alignment layer, the upper panel 200 may include only the common electrode and the alignment layer on the second substrate 210, but is not limited thereto.

The liquid crystal layer 3 provided between the lower panel 100 and the upper panel 200 includes liquid crystal molecules having negative dielectric anisotropy, and the liquid crystal molecules may be aligned so that long axes thereof are substantially perpendicular to the surfaces of the two panels 100 and 200 in a state where no electric field is applied thereto.

The liquid crystal layer 3 includes a plurality of liquid crystals.

When a voltage is applied to the pixel electrode 191 and the common electrode 270, a direction of the long axes of the liquid crystals is changed to a direction that is perpendicular to a direction of the electric field responding to the electric field formed between the pixel electrode 191 and the common electrode 270. A degree of variation in polarization of incident light on the liquid crystal layer 3 is changed according to a degree of inclination of liquid crystal molecules of the liquid crystal layer, and such a polarization variation is represented as a change in transmittance of the light by a polarizer, and as a result, the liquid crystal display displays an image.

Hereinafter, a sealant in the peripheral area according to the exemplary embodiment will be described with reference to FIG. 4 to FIG. 6.

Figure 4:
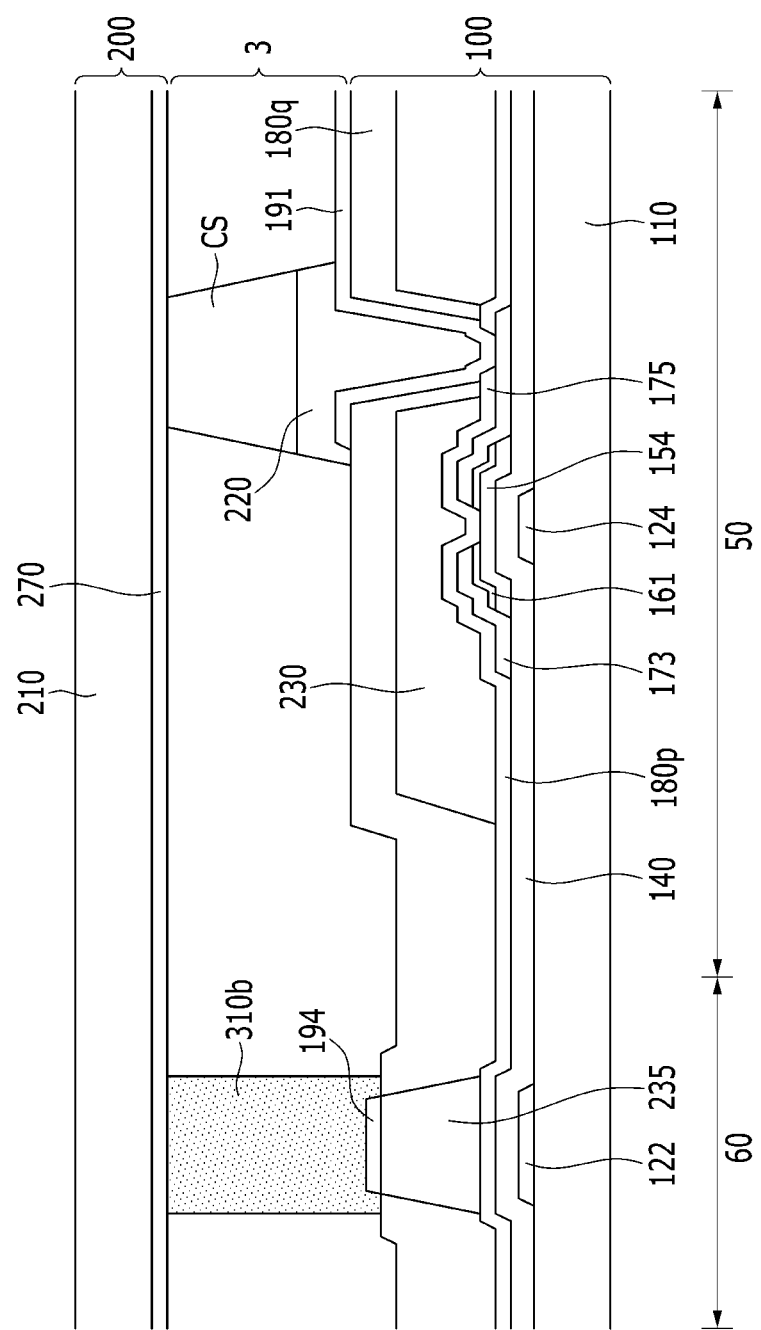
FIG. 4 illustrates an enlarged cross-sectional view of an exemplary embodiment of a display area and a part of a peripheral area of the liquid crystal display of FIG. 1 taken along line IV-IV according to the invention.

FIG. 4 illustrates an enlarged cross-sectional view of an exemplary embodiment of a display area and a peripheral area of the liquid crystal display according to the invention, taken along line IV-IV of FIG. 1. FIG. 5 illustrates an enlarged cross-sectional view of an exemplary embodiment of a peripheral area of the liquid crystal display according to the invention, taken along line V-V of FIG. 1. FIG. 6 illustrates an enlarged cross-sectional view of a comparative example of a peripheral area of a liquid crystal display taken along line V-V of FIG. 1.

Figure 5:
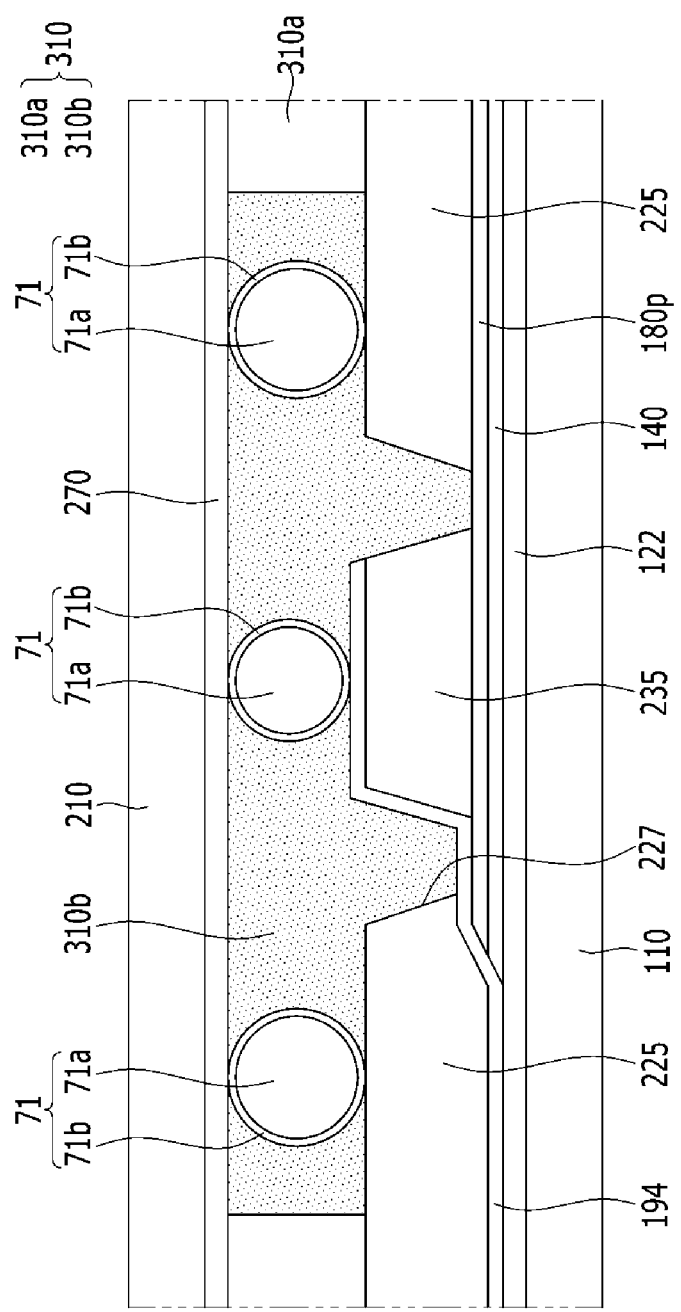
FIG. 5 illustrates an enlarged cross-sectional view of an exemplary embodiment of the peripheral area of the liquid crystal display of FIG. 1 taken along line V-V according to the invention.

Referring to FIG. 4 and FIG. 5, the display area 50 of the liquid crystal display includes the gate electrode 124, the semiconductor stripe 154, the ohmic contact 161, the source electrode 173, the drain electrode 175, the color filter 230, the pixel electrode 191, the light blocking member 220 and the column spacer CS. A description that has been already given with reference to FIG. 2 and FIG. 3 will not be further described.

The peripheral area 60 of the liquid crystal display may include a first common voltage wire 122, a step compensation layer 235, a second common voltage wire 194, a light blocking layer 225, the first sealing portion 310*a* and the second sealing portion 310*b*.

The first common voltage wire 122 is disposed above the first substrate 110 of the peripheral area 60. The first common voltage wiring 122 receives an external common voltage and transmits the received common voltage to the second common voltage wire 194.

In an exemplary embodiment of manufacturing a liquid crystal display, the first common voltage wiring 122 of the peripheral area 60 may be formed through the same process and with the same material as the gate electrode 124 of the display area 50, or may be formed through an additional process. The first common voltage wiring 122 may be in a same layer of the lower panel 100 as the gate electrode 124 from among layers thereof disposed on the first substrate 110. The first common voltage wire 122 may include or be made of various conductive materials. In an exemplary embodiment, for example, the first common voltage wire 122 may include or be made of magnesium (Mg), aluminum (Al), nickel (Ni), chromium (Cr), molybdenum (Mo), tungsten (W), a molybdenum tungsten alloy (MoW), or gold (Au).

The gate insulating layer 140 and the lower passivation layer 180*q* are sequentially layered in order above the first common voltage wire 122. The step compensation layer 235 may be disposed above the lower passivation layer 180*p* of the peripheral area 60.

In an exemplary embodiment of manufacturing a liquid crystal display, the step compensation layer 235 of the peripheral area 60 may be formed of the same material and through the same process as the color filter 230 in the display area 50. The step compensation layer 235 may be in a same layer of the lower panel 100 as the color filter 230 from among layers thereof disposed on the first substrate 110. Particularly, the step compensation layer 235 may include a blue color filter 230. Since a blue color filter can block light leakage better than a red color filter or a green color filter the step compensation layer 235 may include a blue color filter.

The second common voltage wire 194 is disposed above the first common voltage wiring 122 and above the step compensation layer 235. The second common voltage wire 194 is in contact with the first common voltage wire 122 and the second sealing portion 310*b*. The second common voltage wiring 194 may transmit the common voltage applied to the first common voltage wiring 122 to the common electrode 270 through the second sealing portion 310*b*. The first common voltage wiring 122 and second common voltage wire 194 together are referred to as common voltage wires, and a structure of the common voltage wires is not limited thereto.

In an exemplary embodiment of manufacturing a liquid crystal display, the second common voltage wire 194 of the peripheral area 60 may include or be made of a transparent conductive material such as ITO or IZO through the same process as the pixel electrode 191 disposed in the display area 50. The second common voltage wire 194 may be in a same layer of the lower panel 100 as the pixel electrode 191 from among layers thereof disposed on the first substrate 110. In another exemplary embodiment, the second common voltage wire 194 may include or be made of an opaque material, such as including or being formed of chromium (Cr), aluminum (Al), an aluminum alloy, molybdenum (Mo), an alloy thereof or double layers thereof.

The light blocking layer 225 is disposed above the second common voltage wire 194. The light blocking layer 225 may include a light blocking material such as a black-based material so as to reduce or effectively prevent reflection of external light to the second common voltage wire 194. In an exemplary embodiment of manufacturing a liquid crystal display, the light blocking layer 225 of the peripheral area 60 may be formed through the same process with the same material as the light blocking member 220 of the display area 50. The second common voltage wire 194 may be in a same layer of the lower panel 100 as the light blocking member 220 from among layers thereof disposed on the first substrate 110.

The light blocking layer 225 may include defined therein, a contact hole 227 exposing the step compensation layer 235. The step compensation layer 235 may be exposed to the second sealing portion 310b at the contact hole 227. In addition, the second common voltage wire 194 disposed above the step compensation layer 235 may also be exposed to the second sealing portion 310b at the contact hole 227.

That is, referring to FIG. 5, the first sealing portion 310a may be provided above the light blocking layer 225 and the second sealing portion 310b may be provided above the step compensation layer 235.

The sealant 310 may combine the lower panel 100 including layers thereof on the first substrate 110 and the upper panel 200 including layers thereof on the second substrate 210 by being extended along the circumference of the display area 50.

The sealant 310 may include the first sealing portion 310a and the second sealing portion 310b which has a color that is different from that of the first sealing portion 310a. The first sealing portion 310a and the second sealing portion 310b may each extend across an entire cell gap between the lower panel 100 and the upper panel 200. In the peripheral area 60, the first sealing portion 310a and the second sealing portion 310b may not overlap each other. Referring to FIG. 4 and FIG. 5, the first sealing portion 310a and the second sealing portion 310b are in a same layer of the liquid crystal display, such as being disposed adjacent to and non-overlapping with each other. The first sealing portion 310a and the second sealing portion 310b may be provided in plural to define an entire of the sealant 310.

In detail, the first sealing portion 310a forms a gap for liquid crystal injection during manufacturing of the liquid crystal display, reduces or effectively prevents leakage of the injected liquid crystal, and reduces or effectively prevents permeation of moisture or external air into the liquid crystal layer. The first sealing portion 310a may include, an epoxy resin and glass fiber or a spacer which is mixed thereto, for cell gap control. To form the gap for liquid crystal injection during manufacturing of the liquid crystal display, the first sealing portion 310a which has reliability, relatively low cure shrinkage, dimensional stability, relatively high purity and anti-pollutive characteristics is desired. In addition, the first sealing portion 310a may include a thermosetting resin which is curable by heat and a ultraviolet ray curable resin which is cured by ultraviolet light rays. Further, the first sealing portion 310a is generally white.

In an exemplary embodiment of manufacturing a liquid crystal display, where the first sealing portion 310a forms a gap for liquid crystal injection, the gap may be defined between adjacent first sealing portions 310a. The gap defined between adjacent first sealing portions 310a may expose the display area cell gap between the lower and upper display panels 100 and 200 to outside thereof, such that liquid crystal can be injected to the display area cell gap through the gap between adjacent first sealing portions 310a. The second sealing portion 310b may seal the gap defined between adjacent first sealing portions 310a to complete the sealant 310.

Referring again to FIG. 5, the second sealing portion 310b overlaps the step compensation layer 235, and may partially overlap the light blocking layer 225 that is adjacent to the step compensation layer 235.

The second sealing portion 310b may include a conductive ball 71 provided in plural that electrically connects the second common voltage wire 194 disposed on the first substrate 110 and the common electrode 270 disposed on the second substrate 210 to each other.

A lower portion of each conductive ball 71 contacts the second common voltage wire 194 disposed above the step compensation layer 235 on the first substrate 110 of the lower panel 100, and an upper portion of each conductive ball 71 contacts the common electrode 270 disposed on the second substrate 210 of the upper panel 200. Thus, the conductive ball 71 electrically connects the second common voltage wire 194 and the common electrode 270 to each other, and transmits therethrough the common voltage applied to the second common voltage wire 194 to the common electrode 270.

Each conductive ball 71 may be, for example, a structure formed of a ball-shaped body 71a that includes or is made of an organic material and a conductive layer 71b formed on the surface of the body 71a. The conductive layer 71b may include or be made of a relatively high electrically conductive metal, for example, silver (Ag) or gold (Au).

The size of each conductive ball 71 may be greater than or equal to a gap between the step compensation layer 235 and the second substrate 210. Where the size of the conductive ball 71 is greater than the gap between the step compensation layer 235 of the lower panel 100 and the upper panel 200, when the lower panel 100 and the upper panel 200 are assembled to each other by using a pressure force, the conductive ball 71 is deformed under the pressure force to elasticity thereof such that the original size of the conductive ball 71 in the thickness direction becomes equal to the gap between the step compensation layer 235 and the upper panel 200 in the thickness direction.

Referring again to FIG. 5, the conductive balls 71 overlap each of the step compensation layer 235 and the light blocking layer 225 within the peripheral area 60. Since the conductive balls 71 overlap each of the step compensation layer 235 and the light blocking layer 225 within the peripheral area 60, the step compensation layer 235 and the light blocking layer 225 may have the same height taken from the first substrate 110 such that the conductive balls 71 effectively connect the second common voltage wire 194 and the common electrode 270 to each other. Since the plurality of conductive balls 71 included within the second sealing portion 310b are the same size as each other, the second sealing portion 310b may be evenly distributed by forming the height of the step compensation layer 235 and the height of the light blocking layer 225 to be equal to each other.

In an exemplary embodiment of manufacturing a liquid crystal display, the second sealing portion 310b may be formed by coating a conductive paste on the step compensation layer 235 and then hot-pressing the conductive paste.

The second sealing portion 310b has a color that is different from that of the first sealing portion 310a.

In an exemplary embodiment, the first sealing portion 310a has a white color, but in contrast, the second sealing portion 310b may have a black color.

The second sealing portion 310b may include a black-based material, and for example, may have a black color by including a carbon black material. The second sealing portion 310b includes a black material having optical density of greater than or equal to 2.0. Since the second sealing portion 310b including a black material covers the step compensation layer 235 exposed at the contact hole 227 of the light blocking layer 225, viewing of the step compensation layer 235 exposed at the contact hole 227 of the light blocking layer 225 due to reflection of external light or light leakage due to reflection of external light to the second common voltage wire 194 can be reduced or effectively prevented.

FIG. 6 illustrates an enlarged cross-sectional view of a comparative example of a peripheral area of a liquid crystal display, where like constituent elements are designated by like reference numerals and the detailed description of like constituent elements is omitted.

Referring to FIG. 6, in a liquid crystal display according to a comparative example, a sealant 310 extends to be provided above both a light blocking layer 225 and a step compensation layer 235.

A entirety of the sealant 310 in the comparative example generally has a while color, and thus the step compensation layer 235 exposed through a contact hole 227 of the light blocking layer 225 may be undesirably viewable due to reflection of external light S by a second common voltage wire 194 and/or due to light leakage at the peripheral area.

However, in one or more exemplary embodiment of the liquid crystal display according to the invention, the second sealing portion 310b including the black-based material is disposed in an area overlapped with the second common voltage wire 194 that is exposed by the contact hole 227 of the light blocking layer 225 so that visibility of the step compensation layer 235 due to external light can be reduced or effectively prevented and light leakage at the peripheral area can be reduced or effectively prevented.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a first panel comprising:
        a common voltage wire on a first substrate of the first panel; and
        a light blocking layer which is on the common voltage wire and exposes a portion of the common voltage wire;
    a second panel facing the first panel and comprising a common electrode on a second substrate of the second panel; and
    a sealant between the first panel and the second panel and electrically connecting the common electrode of the second panel and the common voltage wire of the first panel to each other,
    wherein the sealant comprises:
        a first sealing portion having a first color, and
        a second sealing portion having a second color different from the first color of the first sealing portion
        wherein the second sealing portion overlaps the exposed portion of the common voltage wire of the first panel and electrically connects the common electrode of the second panel to the common voltage wire.

2. The display device of claim 1, wherein the second color of the second sealing portion is black.

3. The display device of claim 2, wherein an optical density of the second sealing portion is greater than or equal to about 2.0.

4. The display device of claim 2, wherein the second sealing portion comprises a carbon black material.

5. The display device of claim 1, wherein the second sealing portion is in a same layer as the first sealing portion.

6. The display device of claim 1, wherein the second sealing portion comprises a conductive ball provided in plural and disposed therein, the conductive balls electrically connecting the common electrode of the second panel and the second common voltage wire of the first panel to each other.

7. The display device of claim 6, wherein the conductive ball is defined by a body comprising an organic material and a conductive layer which is on an outer surface of the body comprising the organic material.

8. The display device of claim 1, wherein the light blocking layer defines a contact hole therein which exposes the portion of the common voltage wire.

9. The display device of claim 8, further comprising a step compensation layer in the contact hole defined by the light blocking layer,
    wherein the common voltage wire on the first substrate extends to an upper surface of the step compensation layer in the contact hole defined by the light blocking layer.

10. The display device of claim 9, wherein the step compensation layer comprises a blue color filter.

11. The display device of claim 1, wherein the light blocking layer comprises a black-based material.

12. The display device of claim 1, further comprising a display area in which an image is displayed and a peripheral area which surrounds the display area,
    wherein the sealant is extended in the peripheral area along a circumference of the display area in a top plan view.

13. The display device of claim 1, wherein the common voltage wire comprises:
    a first common voltage wire on the first substrate; and
    a second common voltage wire on the first common voltage wire and defining the exposed portion of the common voltage wire, the second common voltage wire contacting the second sealing portion.

14. The display device of claim 1, further comprising a display area in which an image is displayed and a peripheral area which surrounds the display area,
    wherein the first panel comprises disposed in the display area:
        a thin film transistor provided in plural on the first substrate;
        a color filter provided in plural on the thin film transistors;
        a pixel electrode on the color filters; and
        a light blocking member on the color filters,
        wherein the light blocking member comprises a column spacer which protrudes from an upper surface thereof toward the second panel, and maintains a gap between the first panel and the second panel.

15. The display device of claim 14, wherein the light blocking member and the light blocking layer comprise a same material.

16. The display device of claim 15, wherein the light blocking member and the column spacer comprise a same material.

17. The display device of claim 16, wherein a protruded portion of the light blocking member defines the column spacer.

18. The display device of claim 17, wherein the light blocking member and the column spacer each comprise a black-based material.

19. The display device of claim 2, further comprising a display area in which an image is displayed and a peripheral area which surrounds the display area,
   wherein, in the peripheral area,
      the first sealing portion is provided in plural, and
      the second sealing portion which electrically connects the common electrode of the second panel to the common voltage wire of the first panel is disposed between and non-overlapping adjacent first sealing portions.

* * * * *